No. 858,699. PATENTED JULY 2, 1907.
L. W. BOSSERT.
OUTLET BOX.
APPLICATION FILED FEB. 10, 1906.
2 SHEETS—SHEET 1.
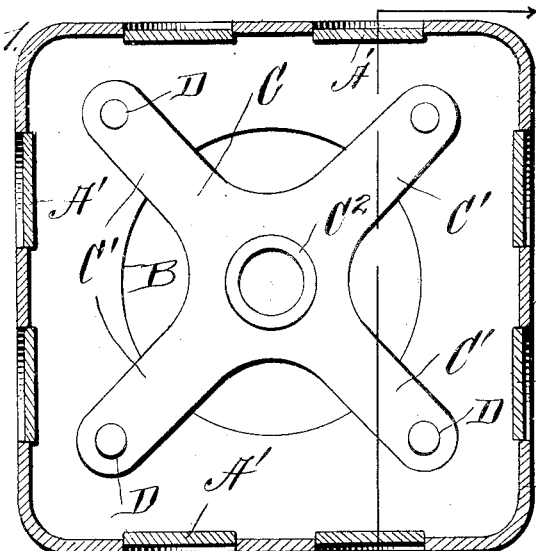
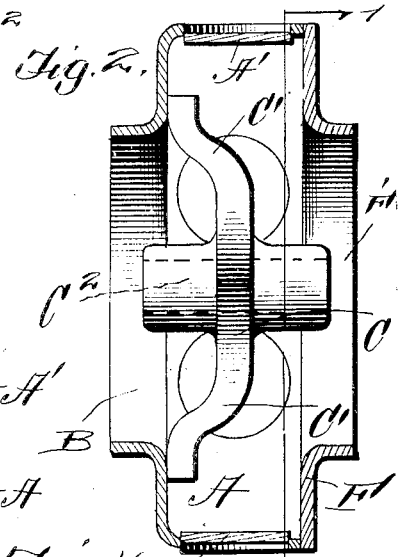
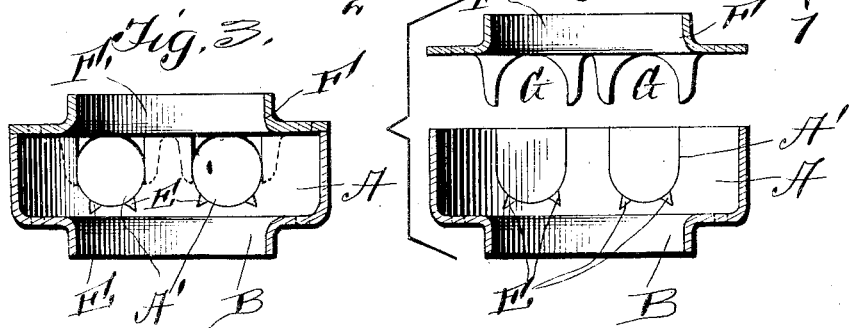
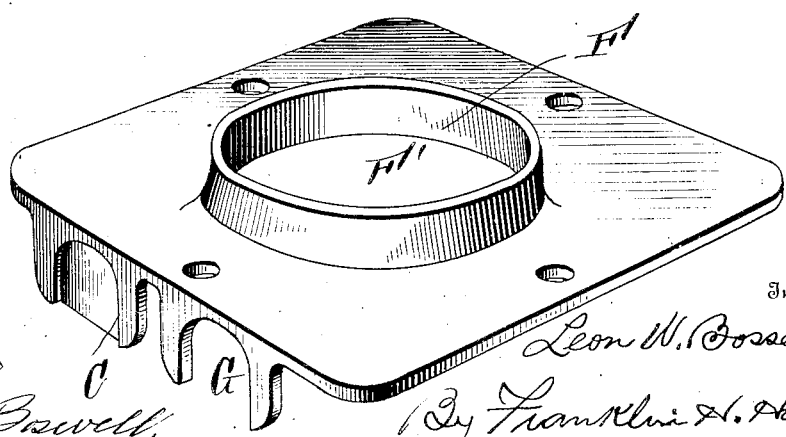
Witnesses
R. A. Boswell,
E. C. Hough.
Inventor
Leon W. Bossert,
By Franklin H. Hough
Attorney

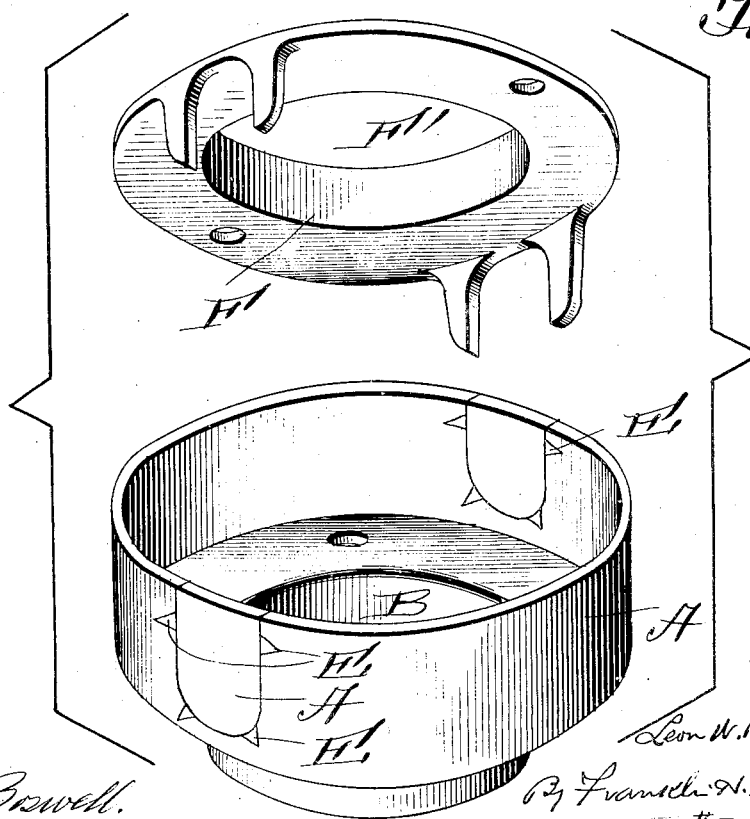

UNITED STATES PATENT OFFICE.

LEON W. BOSSERT, OF UTICA, NEW YORK.

OUTLET-BOX.

No. 858,699.  Specification of Letters Patent.  Patented July 2, 1907.

Application filed February 10, 1906. Serial No. 300,610.

*To all whom it may concern:*

Be it known that I, LEON W. BOSSERT, a citizen of the United States, residing at Utica, in the county of Oneida and State of New York, have invented certain new and useful Improvements in Outlet-Boxes; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in outlet or junction boxes designed to meet the demand for a shallow box for use in making connections from both sides of a partition for electric or gas lights.

More specifically, the present invention comprises an outlet box for fire-proof construction designed for use in connection with partitions of wire lathing. In the electric equipment of partitions of this nature, it is essential that the junction or outlet boxes be provided with means whereby the boxes may be readily slipped on a conduit which is generally installed in advance of the adjustment of the boxes. In many cases where fire-proof buildings are constructed, provision is made for electric or gas lights on either side of a partition and located the same distance from the floor or ceiling and for such purpose, my present box is especially designed.

The present invention comprises a box which is reversed from the usual style of outlet boxes, inasmuch as the so-called bottom of the box is provided with an outlet of sufficient size whereby connections may be made with electric conductors and fixtures for lights, and where the box is utilized for a single light upon one side of a partition, a perfectly flat closed cover is utilized as a substitute for the bottom of the box and when conditions should require connections to be made for a light upon either side of the partition, an open cover is utilized.

The invention consists further in the provision of attaching fixtures to the box or conduit which are especially designed for use in making connections from either or both sides of the box.

My invention consists further in various other details of construction and arrangements of parts which will be hereinafter fully described and then specifically defined in the appended claims.
I illustrate my invention in the accompanying drawings, in which:—Figure 1 is a sectional view on line 1—1 of Fig. 2. Fig. 2 is a sectional view on line 2—2 of Fig. 1. Fig. 3 is a sectional view through a cover and box, with the attaching fixture removed.
Fig. 4 is a sectional view showing the parts illustrated in Fig. 3, as disassembled. Fig. 5 is a detail perspective view of a cover. Fig. 6 is a side elevation of a fixture for a single connection of conduit. Fig. 7 is a sectional view of a round box and cover, and Fig. 8 is a perspective view showing a round box and cover with the parts disassembled.

Reference now being had to the details of the drawings by letter, A designates an outlet box having the plugs A' formed in the walls thereof and in readiness to be removed from their respective openings for the purpose of allowing a conduit to pass therethrough. Said box has an opening B in the top thereof and a fixture stem C having four arms C' projecting at right angles one to another from a central hollow stem $C^2$. Each of said arms has an aperture D, through which a fastening means may be passed to hold the fixture stem to the box. In Fig. 2 of the drawings, I have shown the central hollow stem as extending outward from the opposite sides of said arms, and which construction is designed for supporting fixtures upon either side of a partition. In Fig. 6 of the drawings, I have shown the fixture stem as provided with a hollow box K which extends laterally from one side only of the stem and adapted for the attachment of a fixture upon one side only of a partition. It will be noted that the plugs A' in my improved box are adapted to be entirely severed from the wall of the box excepting at the points E where integral lugs are left for holding the plugs to the box and which lugs may be easily broken when it is desired to form an opening for the reception of a conduit.

F designates a cover having an opening F' and semi-circular-outlined plugged openings G about the lower flange thereof and which plugs are designed to be driven from the flange to form, with the marginal outline of an opening in the wall of the box, a circular-outlined passageway or opening, when the cover is closed. In order to attach an outlet box and cover to conduits which are placed within the narrow partitions of wire lathing in fire-proof construction of buildings as commonly constructed, it is necessary that the openings in the boxes and covers be cut through the marginal edges thereof in order that the boxes and covers may be placed onto the conduit as will be readily understood.

Referring to Fig. 3 of the drawings, will be seen a box made in accordance with my invention with the cover applied thereto, showing corresponding plugs in the box and cover as removed, forming two circular-outlined apertures designed to receive conduits, and in Figs. 7 and 8, I have shown the application of my invention to round outlet boxes in which the same features of construction of cover and box are contemplated.

By the provision of the apparatus shown, it will be noted that when a connection of fixture is to be made with the box from only one side of the partition, the opposite side of the box may be provided with a closed cover, in which event a fixture stem with a hollow boss projecting from one face thereof is provided, and in the event of it being desired to make connection from both sides of the partition with fixtures, either gas or electric, a double-ended boss may be utilized and the cover with an opening to allow the fixture to readily pass therethrough.

What I claim is:—

1. An outlet box and closure therefor, a fixture stem having arms which are fastened to said box, the central portion of said stem being formed into a hollow boss registering with the openings in the closure and the bottom of the box, as set forth.

2. An outlet box and closure therefor, a fixture stem having radial curved arms, the ends of which are fastened to the bottom of the box adjacent to the marginal wall of the opening therein, the central portion of the stem being formed into a hollow boss projecting in opposite directions and in alinement with each other, as set forth.

In testimony whereof, I hereunto affix my signature in the presence of two witnesses.

LEON W. BOSSERT.

Witnesses:
DAYTON ROTH,
CLARENCE W. BOFF.